(12) United States Patent
Talvitie et al.

(10) Patent No.: US 11,675,526 B2
(45) Date of Patent: Jun. 13, 2023

(54) MEMORY-ACCESS CONTROL

(71) Applicant: Nordic Semiconductor ASA, Trondheim (NO)

(72) Inventors: Hannu Talvitie, Trondheim (NO); Marko Winblad, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 47 days.

(21) Appl. No.: 17/048,937

(22) PCT Filed: Apr. 17, 2019

(86) PCT No.: PCT/EP2019/060004
§ 371 (c)(1),
(2) Date: Oct. 19, 2020

(87) PCT Pub. No.: WO2019/202037
PCT Pub. Date: Oct. 24, 2019

(65) Prior Publication Data
US 2021/0232337 A1 Jul. 29, 2021

(30) Foreign Application Priority Data

Apr. 20, 2018 (GB) ...................................... 1806465

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ............................ G06F 3/0655; G06F 3/0604
See application file for complete search history.

(56) References Cited

U.S. PATENT DOCUMENTS 5,579,531 A 11/1996 Sugita
7,650,645 B1 1/2010 Langendorf et al.
(Continued)

FOREIGN PATENT DOCUMENTS

CN 105631364 A 6/2016
CN 105825128 A 8/2016
(Continued)

OTHER PUBLICATIONS

ChipCraft, CC-UART-AXI UART Serial Interface Controller, 2017, Chip Craft, 3 pages (Year: 2017).*
(Continued)

*Primary Examiner* — Gary W. Cygiel
(74) *Attorney, Agent, or Firm* — Klarquist Sparkman, LLP

(57) ABSTRACT

An electronic device comprises a processor, a memory, a memory controller for controlling access to the memory, a hardware security module, and a bus system, to which the processor, the memory controller, and the hardware security module are connected. The hardware security module uses its connection to the bus system to detect requests on the bus system that are sent by the processor. The hardware security module has a secure state and a non-secure state. When in the secure state, the hardware security module adds a secure-state signal to requests sent by the processor over the bus system. The memory controller determines whether memory-access requests include the secure-state signal, and denies access to a secure region of the memory in response to receiving memory-access requests that do not include the secure-state signal.

21 Claims, 4 Drawing Sheets

(56) References Cited

U.S. PATENT DOCUMENTS

| | | | |
|---|---|---|---|
| 8,719,925 | B1 | 5/2014 | Berg |
| 10,140,227 | B1 | 11/2018 | Machulsky et al. |
| 2003/0200451 | A1 | 10/2003 | Evans et al. |
| 2003/0226029 | A1 | 12/2003 | Porter et al. |
| 2004/0143714 | A1 | 7/2004 | Watt |
| 2004/0221173 | A1 | 11/2004 | Moyer et al. |
| 2004/0250063 | A1 | 12/2004 | Gulick et al. |
| 2005/0033969 | A1 | 2/2005 | Kiiveri et al. |
| 2005/0114616 | A1 | 5/2005 | Tune et al. |
| 2006/0090084 | A1 | 4/2006 | Buer |
| 2008/0052534 | A1 | 2/2008 | Harada et al. |
| 2009/0292901 | A1 | 11/2009 | Henry et al. |
| 2010/0186080 | A1 | 7/2010 | Thanner et al. |
| 2011/0225651 | A1 | 9/2011 | Villasenor et al. |
| 2012/0036347 | A1 | 2/2012 | Swanson et al. |
| 2012/0047576 | A1 | 2/2012 | Do et al. |
| 2012/0110659 | A1 | 5/2012 | Brokish et al. |
| 2013/0031290 | A1 | 1/2013 | Schwartz et al. |
| 2013/0031374 | A1 | 1/2013 | Thom et al. |
| 2013/0047250 | A1 | 2/2013 | Kothari |
| 2014/0188732 | A1* | 7/2014 | Kobres ............... H04L 63/0442 713/168 |
| 2014/0282819 | A1 | 9/2014 | Sastry et al. |
| 2014/0304439 | A1 | 10/2014 | Elahi et al. |
| 2014/0366131 | A1 | 12/2014 | Lai |
| 2015/0378944 | A1 | 12/2015 | Robertson et al. |
| 2016/0004647 | A1 | 1/2016 | Eppensteiner et al. |
| 2016/0004656 | A1 | 1/2016 | Arbel et al. |
| 2016/0267038 | A1 | 9/2016 | Elahi et al. |
| 2016/0321472 | A1 | 11/2016 | Pedersen |
| 2016/0357991 | A1 | 12/2016 | Hershman et al. |
| 2017/0060637 | A1 | 3/2017 | Persson et al. |
| 2017/0139851 | A1 | 5/2017 | Pean et al. |
| 2018/0060077 | A1 | 3/2018 | Abdulhamid et al. |
| 2018/0136967 | A1 | 5/2018 | Asbe et al. |
| 2018/0144145 | A1 | 5/2018 | Pearson |
| 2018/0239727 | A1* | 8/2018 | Hershman ............ G06F 13/4221 |

FOREIGN PATENT DOCUMENTS

| | | |
|---|---|---|
| CN | 105683981 B | 10/2018 |
| DE | 102013101508 A1 | 8/2013 |
| EP | 2 725 517 A1 | 4/2014 |
| GB | 2 396713 A | 6/2004 |
| GB | 2 396 930 A | 7/2004 |
| GB | 2 497 528 A | 6/2013 |
| GB | 2 501 470 A | 10/2013 |
| GB | 2 531 844 A | 5/2016 |
| GB | 2 539 455 A | 12/2016 |
| WO | WO 2013/088121 A1 | 6/2013 |
| WO | WO 2016/203193 A1 | 12/2016 |

OTHER PUBLICATIONS

Nath et al., System-on-Chip Security Architecture and CAD Framework for Hardware Patch, conference held: Jan. 22-25, 2018; publication date: Feb. 22, 2018, IEEE, pp. 733-738 (Year: 2018).*
Wu et al., A High-Performance Platform-Based SoC for Information Security, 2006, IEEE, 2 pages (Year: 2006).*
ARM AMBA Arbiter Data Sheet, Chapter 1, Copyright © 1995-1997 ARM Limited, 10 pages.
ARM AMBA 5 AHB Protocol Specification AHB5, AHB-Lite, Copyright © 2001, 2006, 2010, 2015 ARM Limited or its affiliates, 86 pages.
ARM AMBA 3 AHB-Lite Protocol v1.0 Specification, Copyright © 2001, 2006 ARM Limited, 72 pages.
ARM CoreLink SIE-2000 System IP for Embedded, Revision: R2p0, Technical Reference Manual, Copyright © 2016 ARM Limited or its affiliates, 155 pages.
ARM Cortex-M33 Processor Technical Reference Manual, B3.1 About Security Attribution and Memory Protection, http://infocenter.arm.com/help/topic/com.arm.doc.100230_0002_00_en/jfa1433859029571.html, downloaded Jun. 14, 2018, 2 pages.
ARM Security Technology, 2009, Building a Secure System using TrustZone (RTM) technology, arm.com, [online], available from: http://infocenter.arm.com/help/topic/com.arm.doc.prd29-genc-009492c/PRD29-GENC-009492C_trustzone_security_whitepaper.pdf, [Accessed Oct. 16, 2018].
ARM—TrustZone technology for the ARMv8-M architecture, Copyright © 2017 ARM Limited or its affiliates, 28 pages.
International Search Report and Written Opinion for PCT/EP2019/060004, dated Jul. 17, 2019, 12 pages.
IPO Search Report under Section 17(5), dated Oct. 18, 2018, 6 pages.
New AMBA Specification Extends Security to Embedded Design: AMBA 5 AHB5, https://community.arm.com/processors/b/blog/posts/new-amba-specification-extends- . . . , downloaded Apr. 25, 2018, 6 pages.
Payne, "How to Implement a Secure IoT system on ARMv8-M," Published on Apr. 14, 2017, 3 pages.
TrustZone—Arm Developer, arm TrustZone, Introducing Arm TrustZone, https://developer.arm.com/technologies/trustzone, downloaded Apr. 25, 2018, 11 pages.
Yee, Carnegie Mellon University, 1994, "Using Secure Coprocessors", Bennet Yee, citeseerx.ist.psu.edu. [online]. Available from: http://citeseerx.ist.pdu.edu/viewdoc/download?doi=10.1.1.28.4872&rep=rep1&type=pdf, [Accessed Oct. 16, 2018].
Cyclone v Hard Processor System Technical Reference Manual, Altera, Cover Page, Table of Contents, Chapter 7, pp. 16, 36-60 and Chapter 11, p. 23, Oct. 28, 2016.
U.S. Appl. No. 17/255,872, filed Dec. 23, 2020, Winblad et al.
U.S. Appl. No. 17/255,876, filed Dec. 23, 2020, Barzic et al.
U.S. Appl. No. 17/255,921, filed Dec. 23, 2020, Dekens.
ARM1176JZ-S, Revision: r0p7, Technical Reference Manual, Table of Contents, List of Tables, List of Figures, Preface, Figure 2-2, Nov. 27, 2009, 24 pages.
Arm® CoreLink™ SSE-200 Subsystem for Embedded, Revision: r1p0, Technical Reference Manual, Copyright © 2016, 2017 Arm Limited (or its affiliates), 178 pages.
Murray, John M., "Microcomputer Peripherals," IEEE Transactions on Industrial Electronics and Control Instrumentation, vol. IECI-25, No. 4, Nov. 1978, pp. 303-322.
Abdelnour et al., Peripheral Component Interconnect-Lite Bus Interface Design, TDB, v40 n7 07-97, Jul. 1, 1997, p. 55-56. (Year: 1997).
Ip.com, "Method and System for Passing Messages in a PCIe Environment," IPCOM000237920D, Jul. 21, 2014, pp. 1-6. (Year: 2014).
Merkin et al., "Method to Bound Peripheral Component Interconnect System Configurations," TDB, v37 n10 10-94, Oct. 1, 1994, pp. 455-456. (Year: 1997).
Pannuto et al., "MBus: A System Integration Bus for the Modual Microscale Computing Class," in IEEE Micro, vol. 36, No. 3, pp. 60-70, May-Jun. 2016, doi: 10.1109/MM2016.41. (Year: 2016).

* cited by examiner

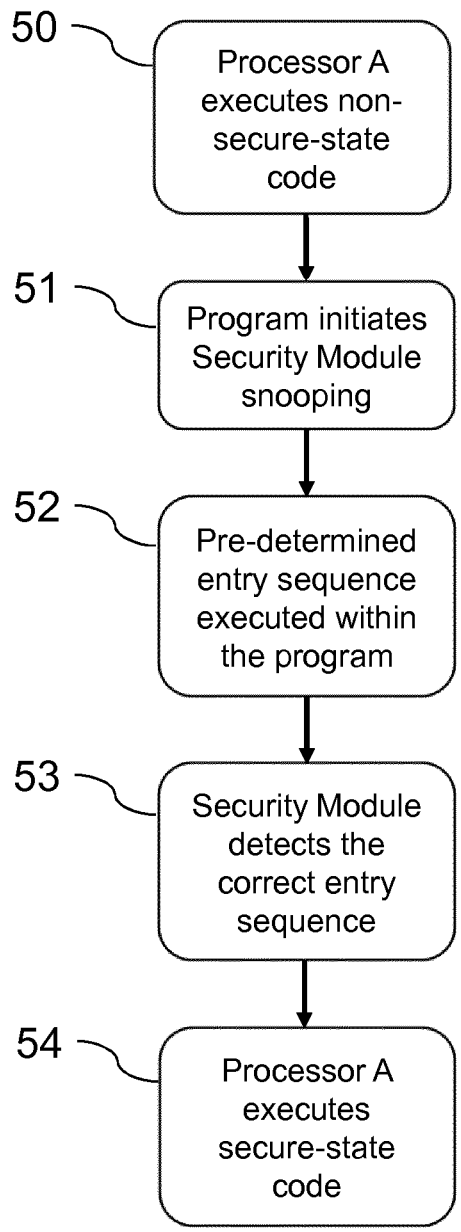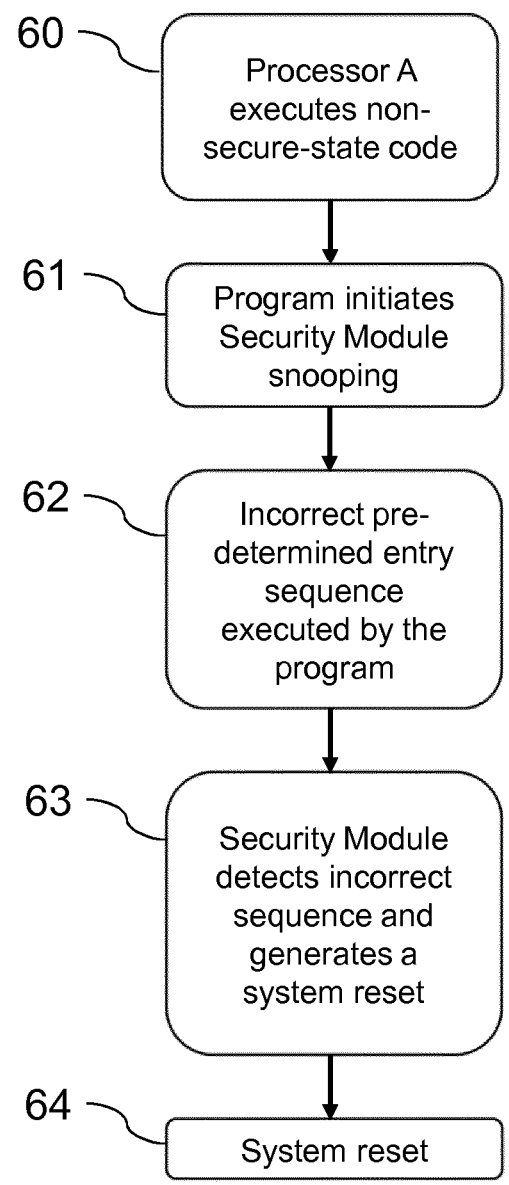
FIG. 5
FIG. 6

MEMORY-ACCESS CONTROL

CROSS REFERENCE TO RELATED APPLICATIONS

This is the U.S. National Stage of International Application No. PCT/EP2019/060004, filed Apr. 17, 2019, which was published in English under PCT Article 21(2), which in turn claims the benefit of Great Britain Application No. 1806465.9, filed Apr. 20, 2018.

BACKGROUND OF THE INVENTION

This invention relates to methods and electronic devices for controlling access to a secure region of memory.

The electronic memory on electronic devices, such as integrated system-on-chip devices, may contain sensitive information, such as data or software code, to which access should be restricted. Trying to restrict access to certain regions of memory through software measures alone is not particularly secure, and is vulnerable to hacking and to software bugs. Providing hardware mechanisms that restrict access to particular regions of memory is generally going to be more secure.

Arm™ TrustZone provides compatible Arm™ microcontrollers (e.g., a Cortex™-M33) with two operating states: "Secure" and "Non-Secure". The product designer can designate certain regions of memory, or certain peripherals (e.g., a cryptoprocessor), as being "secure-world" resources, while other regions of memory and peripherals are not so designated. Hardware logic in the bus fabric ensures that no "secure-world" resources can be accessed directly by "non-secure-world" software, thereby providing a security perimeter around sensitive resources. Non-secure (non-trusted) software applications cannot access secure (trusted) resources directly, but must request access through APIs (application programming interfaces) provided by secure software. These APIs can implement authentication checks to decide whether to permit access to a secure service. This approach makes it harder for attackers, who may have compromised part of the non-secure software code, to access sensitive information stored on such a device, or for software bugs to inadvertently gain access to secure resources.

Arm™'s Advanced Microcontroller Bus Architecture (AMBA™) Advanced High-Performance Bus (AHB) specification "AHB 5" is an open interface protocol for embedded SoCs. It defines an additional signal, HNONSEC, that can be asserted by a compatible Arm™ TrustZone processor, during the address phase of a bus transfer, to distinguish between a "Secure" transfer and a "Non-secure" transfer. Bus infrastructure components can support partitioning of memory spaces in memory components, to block non-secure accesses to secure memories. Secure transactions can only be generated by Secure software or, in cases of testing, an authorised debugger.

Such an approach can provide increased security for devices that use compatible Arm™ TrustZone processors. However, it does not work with processors that do not have a concept of internal "secure" and "non-secure" operating states.

The present invention seeks to provide an approach to controlling memory access that does not require a processor that supports "secure" and "non-secure" hardware processor states.

SUMMARY OF THE INVENTION

From a first aspect, the invention provides an electronic device comprising:
   a processor;
   a memory;
   a memory controller for controlling access to the memory;
   a hardware security module; and
   a bus system, to which the processor, the memory controller, and the hardware security module are connected,
wherein:
   the processor is configured to send requests over the bus system;
   the hardware security module has a connection to the bus system and is configured to use this connection to detect requests on the bus system that are sent by the processor;
   the hardware security module has a secure state and a non-secure state;
   the hardware security module is configured, when in the secure state, to add a secure-state signal to requests sent by the processor over the bus system;
   the memory controller is configured to receive memory-access requests over the bus system, and to determine whether the received memory-access requests include the secure-state signal;
   the memory controller is configured to grant access to a secure region of the memory in response to receiving a memory-access request that includes the secure-state signal; and
   the memory controller is configured to deny access to the secure region of the memory in response to receiving a memory-access request that does not include the secure-state signal.

From a second aspect, the invention provides a method of operating an electronic device, the electronic device comprising:
   a processor;
   a memory;
   a memory controller for controlling access to the memory;
   a hardware security module; and
   a bus system, to which the processor, the memory controller, and the hardware security module are connected,
and the method comprising:
   the processor sending requests over the bus system;
   the hardware security module using a connection to the bus system to detect said requests;
   the hardware security module being in a secure state and, when in the secure state, detecting a first memory-access request sent by the processor over the bus system and adding a secure-state signal to the first memory-access request over the bus system;
   the memory controller receiving the first memory-access request over the bus system, detecting that the secure-state signal has been added to the first memory-access request, and, in response to said detecting, granting access to the secure region of the memory;
   the hardware security module being in a non-secure state and, when in the non-secure state, detecting a second memory-access request sent by the processor over the bus system and not adding the secure-state signal to the second memory-access request over the bus system; and
   the memory controller receiving the second memory-access request over the bus system, detecting that the secure-state signal has not been added to the second memory-access request, and, in response to said detecting, denying access to the secure region of the memory.

Thus it will be seen that, in accordance with the invention, a hardware security module is provided that monitors requests on the bus system and that adds a secure-state signal to bus transfers initiated by the processor when the hardware security module is in a secure state. In this way, it is not necessary for the processor itself to support secure and non-secure states. This allows embodiments of the electronic device to support a concept of secure and non-secure states, which the memory controller can use to grant or deny access to the secure region of memory, while using a known processor design (e.g., an Arm™ Cortex™-M0 or -M4) that has no inherent concept of secure and non-secure states, and that cannot directly assert a secure-state signal over the bus system. This greater design freedom can allow a designer to choose a processor for the electronic device that has a lower cost and/or lower power consumption compared with a comparable secure-aware processor. The device may also use the same mechanism to control access to peripherals, as described in more detail below.

The secure and non-secure states provided by the hardware security module and the memory controller can be used however a designer wishes. Typically, however, software code will be divided into secure code and non-secure code, with non-secure code executing when the hardware security module is in the non-secure state, and not being able access one or more secure regions of the memory, and with secure code executing when the hardware security module is in the secure state, and having access to the one or more secure regions of the memory (and potentially having access to all the memory on the device, depending how the device is configured). Other resources, such as peripherals, may also have some operations that can only be accessed when the hardware security module is in the secure state. In general, it is likely that the device will spend most of its execution time in the non-secure state, with only occasional switches to the secure state—e.g., after a cold or warm reset, or when storing a new cryptographic private key—although this is not essential.

Note that the secure and non-secure states relate to the bus system and can potentially affect every device that is attached to the bus system; this is different from processor states, such as privileged/kernel and normal/user execution modes, which are implemented within one processor, whereby the processor requires code executing in normal/user-mode to make a system call before privileged processor instructions and system resources can be accessed. Embodiments of the present device may support privileged and non-privileged processor modes in addition to the secure and non-secure states—i.e., the processor may support privileged and non-privileged execution modes.

The memory controller may be configured, when a memory-access request does not include the secure-state signal, to deny write access to the secure region, or to deny data read access to the secure region, or to deny execution access (i.e., instruction fetches) to the secure region, or to deny all of these access types, or any combination thereof.

The secure region of memory could be a region of non-volatile memory (e.g., flash) or a region of volatile memory (e.g. RAM), or may comprise both non-volatile and volatile sub-regions. It may comprise code memory or data memory. It may comprise one or more hardware registers—e.g., of a memory-mapped peripheral.

The hardware security module may be a hardware state machine. It may comprise any number of logic gates. It preferably does not contain a general-purpose processor. It may comprise one or more input or output registers which may be addressable over the bus system, although this is not essential.

The hardware security module may be configured, when in the secure state, to detect all requests that pass its connection to the bus system, or at least all requests initiated by the processor. It may be configured to add the secure-state signal to all detected requests, when in the secure state, or it may be configured to add the secure-state signal only to certain detected requests—e.g., based on the source of the requests or on the type, address or content of the requests. For instance, it may add the secure-state signal only to requests originating from the processor, or only to read requests or only to write requests, or only to requests that have a target address in a predetermined set of monitored addresses.

When it is in the non-secure state, the security module may continue to monitor requests on the bus system, or it may cease detecting requests in order to save power—this ceasing may happen in response to being switched to the non-secure state, or it may happen in response to an instruction issued by software executing on the processor. The security module may comprise a hardware register which, when set to a first value (e.g., by a write from the processor, when executing non-secure software), causes the security module to start monitoring the bus system. The same hardware register may be used to turn off the monitoring, when set to a second value.

The hardware security module may be configured to start in the secure state after the device is reset. This can allow the device to build a chain of trust for secure processor execution after each reset. Software (e.g. firmware) in the memory of the device may then cause the processor to instruct the hardware security module to switch to the non-secure state, at an appropriate point after reset. The first switch to the non-secure state after reset may be performed by boot code that is executed after every reset.

The secure-state signal may be sent over a secure-state signal line in the bus system; the secure-state signal line may be a dedicated line that is only used to indicate a security state. The line may be single-bit line. The sending of the secure-state signal is preferably synchronised with a corresponding request sent by the processor—e.g., being injected during an address phase of a bus transfer initiated by the processor. In some embodiments, the bus system is an AMBA bus system; it may comprise one or more AHB's and/or one or more Advanced Peripheral Buses (APB's). The bus system may implement the AHB 3, AHB 5 or higher specification. The secure-state signal may be sent over an AHB HNONSEC signal line—e.g., by de-asserting HNONSEC to communicate the secure-state signal. Alternatively, the secure-state signal may be sent over an AHB HPROT signal line—e.g., by setting HPROT[2] or HPROT[3] high to communicate the secure-state signal. The HPROT[2] and [3] lines may be used in some devices to indicate whether transfers are bufferable and modifiable, respectively; however, in some implementations these signals are not required and so HPROT[2] and [3] are effectively spare and the inventors have recognised that they can therefore conveniently be used, individually or in combination, by a hardware security module to add a secure-state signal to an existing bus transfer by a hardware security module as disclosed herein.

The hardware security module may alternatively add the secure-state signal by modifying or augmenting a request sent by the processor—e.g., by setting a spare bit in an address field of the request, or by appending an additional bus transfer to the processor request (e.g., as part of a burst of bus transfers) that indicates that the hardware security module is in the secure state.

It will be appreciated that the secure-state signal may, in some embodiments, be communicated by an absence of a signal; for example, the hardware security module may be configured to send a non-secure-state signal when in the non-secure state, and not to send the non-secure-state signal when in the secure state.

The device may comprise one or more peripherals, such as serial interfaces, parallel interfaces, ADCs, DACs, cryptographic accelerators, DSPs, timers, radio interfaces, etc. A peripheral of the device may comprise access logic configured to grant access to a function of the peripheral in response to receiving a request over the bus system that includes the secure-state signal, and to deny access to the function in response to receiving a request over the bus system that does not include the secure-state signal. In this way, the peripheral can be secure-aware. The access logic may be an inherent part of the peripheral, or it may be a gate or firewall between the bus system and the peripheral. In some embodiments, every function provided a peripheral may be restricted to secure-state transactions; in other embodiments, only a subset of a peripheral's functions are so restricted, with other functions being unrestricted.

The device may support memory-mapped I/O access to the peripherals. This allows the device to control access to peripherals by the hardware security module adding the secure-state signal to read and/or write requests addressed to the peripherals, with minimal or no impact on system timing.

The memory controller may be a hardware state machine. It may comprise any number of logic gates. It preferably does not contain a general-purpose processor. It may comprise one or more input or output registers which may be addressable over the bus system, although this is not essential. When denying access to a memory-access request, the memory controller may ignore the request (e.g., a read request), or it may signal a bus fault, or it may respond with an empty or null response, or respond in any other appropriate way.

The definition of the secure region of the memory may be hardwired into the memory controller, or it may be configurable—e.g., based on one or more configuration parameters stored in a non-volatile memory of the device, such as a start address value and an end address value. Similarly, access control to peripheral functions may be hardwired or may be configurable. The hardware security module and memory controller may be configured to prevent the processor from writing to the addresses of such configuration parameters when the hardware security module is in the non-secure state (and optionally all the time). In some embodiments, boot code that contains instructions that are executed after a reset may be stored in the secure region of the memory. The boot code may write a configuration parameter to an address in non-volatile memory that defines the secure region, thereby protecting itself from being accessed once the boot code has changed the hardware security module to the non-secure state (unless other software subsequently changes the hardware security module back to the secure state).

The secure region may comprise a plurality of non-contiguous address ranges. The memory controller may control access to a plurality of secure regions, which may be in volatile memory (e.g., SRAM) and/or non-volatile memory (e.g., Flash).

In some embodiments, the hardware security module may be configured, when in the secure state, to prevent the processor from fetching instructions or executing code stored other than in the secure region (or another equivalent secure region). This ensures that only trusted "secure-state" code is executed while in the secure state, which can help to prevent non-secure code being executed in the secure state, either inadvertently (e.g., due to a bug) or maliciously (e.g., due to an attacker). The security module may do this by determining whether the address of an instruction-fetch request on the bus system is outside a predetermined range corresponding to the secure region or regions (or, equivalently, is within a predetermined address range corresponding to one or more non-secure regions of the memory). The security module may thus comprise logic for comparing the address of a passing bus request with a predetermined set or range of values. If the security module detects an attempt to fetch an instruction from a non-secure region of memory, while in the secure state, it may trigger a system reset. Alternatively, the comparison logic could be implemented at the memory controller, and the memory controller could be configured to trigger the system reset. The address range may be fixed (e.g., hard-coded) or configurable (e.g., being stored securely in non-volatile memory). The security module may read a bus access attribute from a bus request to determine whether the request is an instruction fetch or a data read, and may block only instruction fetches containing non-secure addresses, or it may block all reads containing non-secure addresses.

In some embodiments, the hardware security module may be configured to use its connection to the bus system to detect requests on the bus system that are sent by a bus master other than said processor, and, when in the secure state, to add the secure-state signal to requests sent by said bus master over the bus system. The bus master could be a second processor, a peripheral that supports DMA (direct memory access) access, or a standalone DMA controller. Such embodiments can provide greater flexibility. They may, for example, enable a trusted peripheral, such as a cryptoprocessor, to be granted access to the secure region of memory, when the hardware security module is in the secure state, rather than limiting secure-state access only to the processor. However, in other embodiments, the hardware security module adds the secure-state signal only to bus transfers initiated by the processor, and not to any bus transfers initiated by other bus masters in the device, such as peripherals or other processors.

The hardware security module may be configured to switch from the secure state to the non-secure state in response to a switch-to-non-secure command from the processor. Similarly, the hardware security module may be configured to switch from the non-secure state to the secure state in response to a switch-to-secure command from the processor. These commands may be the same (i.e., one command may toggle the security state) or they may be different commands. Software executed by the processor may instruct the processor to issue the command. The memory may store software comprising instructions which, when executed by the processor, cause the hardware security module to switch from the secure state to the non-secure state, or vice versa.

For each such command, the hardware security module may be configured to receive the command at least partly over the bus system—e.g., as one or more bus transfers. The command may be addressed to the hardware security module—e.g., comprising one or more write transfers addressed to a register address that is mapped to the hardware security module. Alternatively, the command may be addressed to an address that is not an address of a register accessible to the hardware security module (e.g., addressed to a non-existent address); in this case, the hardware security module may use its connection to the bus system to detect (i.e., "sniff" or "snoop" for) the command from the bus system. The command may comprise one or more predetermined data values, in one or more bus transfers, which may need to be addressed to one or more predetermined address values. In some embodiments, hardware security module may be configured to receive the command by receiving or detecting a predetermined sequence of one or more predetermined address and/or predetermined data values. In some embodiments, the sequence comprises a plurality of address and/or data values, which may different from each other. A very particular sequence of software instructions may need to be executed to cause the command to be issued to the hardware security module. In this way, it can be made extremely unlikely that other software executing on the processor would, by chance, cause the command to be issued to the hardware security module. It is also very difficult for an attacker to determine how to switch the hardware security module from a non-secure to a secure state.

In some embodiments, the command to switch to the secure state may be, or may comprise, the processor branching to a predetermined trigger address—i.e., initiating an instruction-fetch bus transfer for the trigger address. The trigger address may be fixed but is preferably set in accordance with a value stored in a configuration register of the hardware security module. This configuration register may be located in a secure region of the memory, which can only be accessed in the secure state. In this way, secure boot code, executed while the device is in the secure state immediately after a system reset, may write the trigger address value to the configuration register after the system reset, and then switch the device to the non-secure state. Only software that knows the trigger address can then instruct the processor to issue the command to switch back to the secure state.

The hardware security module may additionally or alternatively be configured to receive the command at least partly over a connection between the hardware security module and the processor that is separate from the bus system. For example, the hardware security module may comprise one or more connections to one or more internal registers of the processor, or to other points in the processor that allow the hardware security module to detect hardware signals or logic levels within the processor. The hardware security module may comprise logic for sensing such internal signals, or the contents of such internal registers, and for receiving the, or each, command from the processor at least partly based on detecting a predetermined value, or a predetermined sequence of values over time, in said signals or internal registers. The predetermined value, or sequence of values, may correspond to a predetermined sequence of one or more software instructions which, when executed by the processor, cause an internal signal or signals, or register or registers, to have the predetermined value, or the predetermined sequence of values over time.

By these means, it is possible for software to switch the hardware security module between the secure state and the non-secure state. This can be done without requiring the processor to support a dedicated processor instruction, such as the Secure Gateway (SG) processor instruction from the Arm™ v8-M Security Extensions, or Arm™'s Secure Monitor Call (SMC) processor instruction.

The hardware security module may additionally or alternatively be configured to communicate data to the processor—e.g., by setting a value in a register which the processor reads. A switch command may then comprise a data exchange between the processor (under control of software) and the hardware security module. For example, the command to switch to the secure state may be received by the hardware security module only when a valid two-way data exchange has been performed between the hardware security module and the processor according to a predetermined protocol. The data exchange may implement a challenge-response protocol or a cryptographic protocol.

The switch command, or each switch command, may be constant over time, or it may change over time—e.g., depending on how many state changes have occurred since the device was last reset.

In some embodiments, a command to switch from the secure state to the non-secure state may be relatively simple, whereas a command to switch from the non-secure state to the secure state may be relatively complex—e.g., involving a longer sequence of processor instructions.

The hardware security module may comprise logic for detecting an error in a switch command, such as secure-state entry sequence or a secure-state entry sequence—for example, by detecting an initial portion of a predetermined pattern of processor signals or values and/or bus transactions and then determining that a later portion of the pattern deviates from a predetermined pattern expected by the hardware security module. This deviation may be indicative of an attempted attack by an intruder—e.g., an attacker trying to switch the hardware security module to the secure state so as to access sensitive information stored in the secure region of the memory, or in a register of a secure peripheral such as a cryptoprocessor—or may be caused by a coding error (a software bug). The hardware security module may be configured to perform a reset on detecting such an error; this can lead to a re-start of the device and a re-boot of the processor.

In some embodiments, the hardware security module may comprise one or more additional interfaces for controlling whether it is in a secure state or a non-secure state, such as a debug interface for controlling the state from an external debugger.

The hardware security module may comprise configuration logic for reading one or more configuration parameters from a non-volatile memory of the device. It may use the configuration parameter to determine when or how to change state. The configuration parameter could be written to the non-volatile memory during a manufacturing step of the device, or during a subsequent firmware update. The hardware security module and memory controller may be configured to prevent the processor from writing to the address of the configuration parameter at any time or when the hardware security module is in the non-secure state. The module may read the configuration parameter after every reset release, preferably before the processor (or any other processor of the device) is released from reset. This may be achieved by the hardware security module comprising logic for holding and then releasing the processor reset. In this way, the configuration parameter can be protected from being changed by software, or non-secure software, executing on the processor, before the hardware security module is active.

It will be appreciated that some embodiments may support more than two security states—e.g., having three states: a non-secure state, a secure state, and a very-secure state. The hardware security module may be configured to add an appropriate security state signal depending on what security state the hardware security module is in. The memory controller and/or peripherals may be configured to grant or deny access based on the security state signal.

The electronic device may be an integrated-circuit device. In some embodiments, it is a system-on-chip or radio-on-chip device. The processor may be an Arm™ processor, which may or may not implement TrustZone, or any other processor design—e.g., any open-source or commercial processor. The device may comprise a plurality of processors. The memory may comprise volatile and/or non-volatile memory.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIG. 5 is a flow chart of steps performed by the device during a successful switch from the non-secure state to the secure state; and FIG. 6 is a flow chart of steps performed by the device during an unsuccessful attempt to switch from the non-secure state to the secure state.

DETAILED DESCRIPTION

Figure 1:
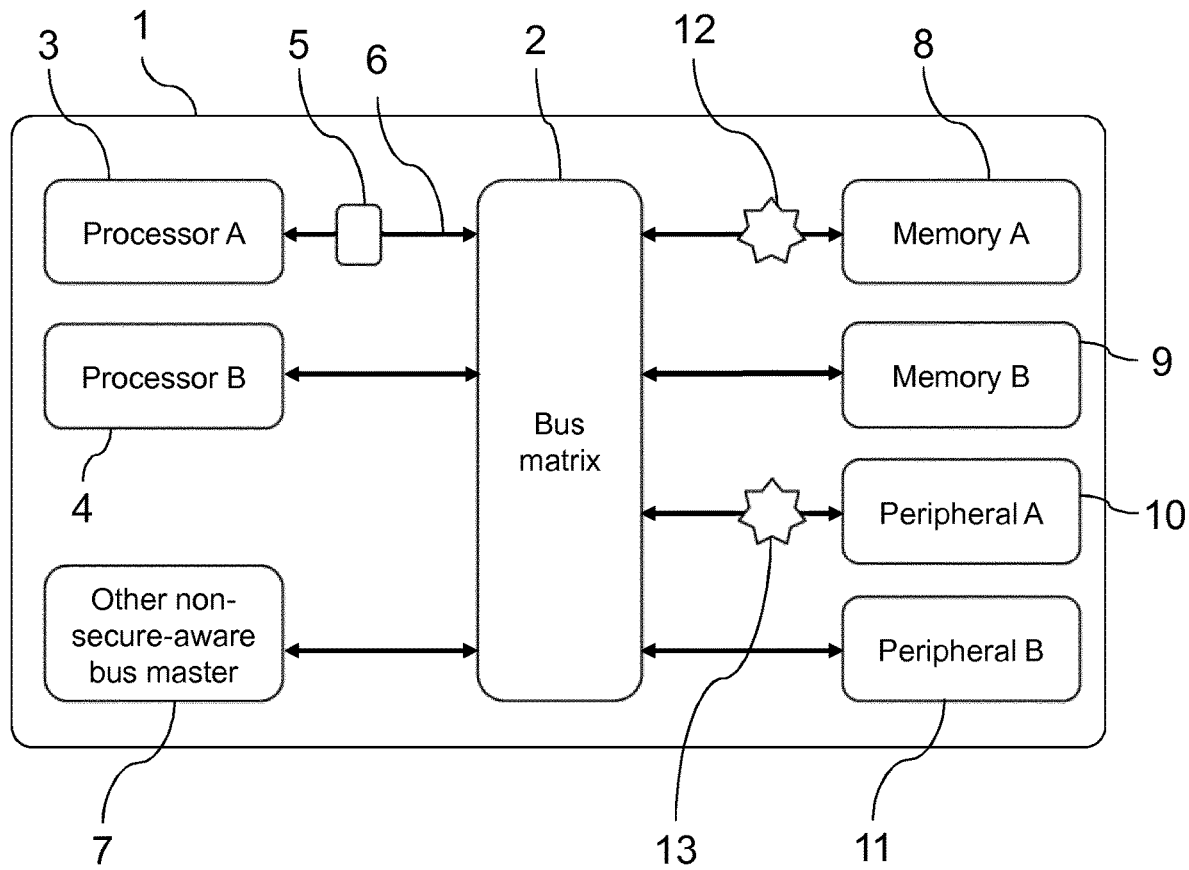
FIG. 1 is a schematic drawing of a system-on-chip device embodying the invention.

FIG. 1 shows a system-on-chip 1, which is an integrated-circuit silicon device. It has a bus system (e.g., implementing an ABMA specification) that includes a bus matrix 2 with connections to a first processor (Processor A) 3 and a second processor (Processor B) 4. Neither processor 3, 4 is inherently secure aware. They could, for instance, both be Arm™ Cortex™-M4 processors.

However, software executing on the first processor 3 is provided with a secure-aware capability through the provision of a hardware security module 5. The hardware security module 5 is connected to a bus 6 (e.g., an AHB bus) that links the first processor 3 to the bus matrix 2, between the first processor 3 and the bus matrix 2. Its operation is described below.

The second processor 4, however, is not provided with a similar hardware security module so remains not secure-aware. Similarly, a representative bus master 7 is shown in FIG. 1 (which could be an analogue-to-digital converter, for example, or any other peripheral that can initiate bus transactions); this also is connected directly to the bus matrix 2 without an associated hardware security module, so is not secure-aware.

In other embodiments, however, further processors or bus-master peripherals could be connected to the bus matrix 2 via respective hardware security modules, or could be located on the same bus 6 as the first processor 3 and be connected to the bus matrix 2 via the hardware security module 5. In this case, these further processors or bus-master peripherals can be made secure-aware.

Also connected to the bus matrix 2 are a first memory (Memory A) 8, a second memory (Memory B) 9, a first peripheral (Peripheral A) 10, and a second peripheral (Peripheral B) 11. The first and second memories 8, 9 may each consist of volatile memory (e.g., SRAM), non-volatile memory (Flash), or a combination of both. The first and second peripherals 10, 11 are slaves on the bus matrix 2; they could be any peripherals. It will be understood that these memories 8, 9 and peripherals 10, 11, and their connections to the bus matrix 2, are only representative, and many variations are possible in alternative embodiments.

Situated between the first memory 8 and the bus matrix 2 is a memory controller 12, which will also be referred to herein as a memory firewall. Situated between the first peripheral 10 and the bus matrix 2 is a peripheral firewall 13. These firewalls 12, 13 are hardware units that cooperate with the security module 5 such that the first memory 8 and the first peripheral 10 become part of a "secure world" for the device 1. Using this architecture, some or all of the first memory 8, and some or all of the operations of the first peripheral 10, can be made to be inaccessible to the second processor 4 and the bus-master peripheral 7, and to be accessible to the first processor 3 only when the security module 5 is in a secure state.

The hardware security module 5 is a finite state machine that has a separate identity from the first processor 3, and that has its own connection to the bus 6. It can be in one or two principal states, referred to herein as secure and non-secure. The security module 5 monitors ("snoops" on) all bus transactions passing its connection to the bus 6. When in the non-secure state, it does not modify bus transactions initiated by the first processor 3. When in the secure state, for each request it detects from the first processor 3, the security module 5 introduces an additional signal onto the bus 6, simultaneously with the passing bus request, to indicate that the request is a "secure" request.

In one embodiment, the bus 6 is an Arm™ AMBA 3 AHB that has HPROT signal lines, and the security module 5, when in the secure state, asserts the HPROT[3] "Modifiable" signal line for every request issued by the first processor 3, using a timing that matches the timing of the address bus for the request.

The security module 5 switches between the secure state and the non-secure state in response to respective commands from the first processor 3. In some embodiments, it receives these commands over the bus 6—e.g., as predetermined writes to one or more register addresses allocated to the security module 5. In other embodiments, it receives these commands over one or more lines (not shown), connecting the security module 5 to the first processor 3, which are separate from the bus 6. These lines may connect to registers within the processor 3 and allow the security module 5 to "snoop" on the internal state of the processor 3. In some embodiments, a command to switch to the secure state may involve both mechanisms—i.e., the security module 5 detecting one or more predetermined bus transactions and one or more predetermined internal states of the processor 3, in a predetermined order or sequence. If an invalid order or sequence is detected (e.g., one that starts out correctly, but then deviates), the security module 5 may trigger a reset of the first processor 3 or of the whole device 1. In this way, legitimate software executing on the first processor 3 (e.g., a bootloader stored in the second memory 9) can cause the security module 5 to switch to the secure state, while an attacker, who does not know the instruction sequence for signalling the switch command, will not be able to do so. The instructions may be static, or they may change over time.

The firewalls 12, 13 contain digital logic that is responsive to the HPROT[3] signal line from the bus matrix 2 and that will block bus requests for protected memory regions or protected peripheral functions unless the HPROT[3] line is asserted at the appropriate time during the request. The definitions of one or more protection regions of the first memory 8, and of one or more protected operations of the first peripheral 10, may be hard-coded into the respective firewalls 12, 13, or the firewalls 12, 13 may read configuration data that provides these definitions from configuration registers in a non-volatile region of the first memory 8. These configuration registers may be in a region of the first memory 8 that is subsequently protected from writes and further reads by the memory firewall 12, once the security module has been switched to the secure state—e.g., by boot-loader code that is executed automatically after the device 1 is reset.

Figure 2:
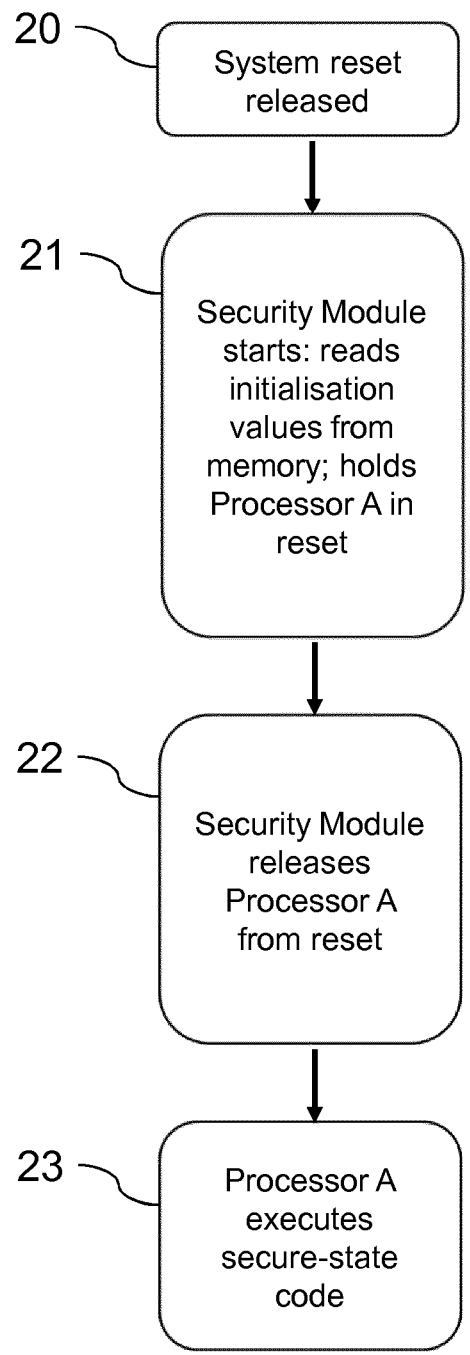
FIG. 2 is a flow chart of steps performed by the device during a boot sequence after a system reset.

FIG. 2 shows some relevant steps performed by the device 1 during a boot sequence after a system reset. In a first step 20, the device 1 is released from system reset. In a second step 21, the security module 5 reads initialisation values (configuration data) from a non-volatile configuration region of the first memory 8, while holding the first processor 3 in reset. In a third step 22, the security module 5 releases the first processor 3 from reset. In a fourth step 23, the first processor 3 starts executing program code (e.g., a bootloader) with the security module 5 being in a secure state, thereby allowing the code to access memory regions and peripheral operations located behind the firewalls 12, 13; this program code is therefore referred to as "secure-state code" in FIG. 2.

Figure 3:
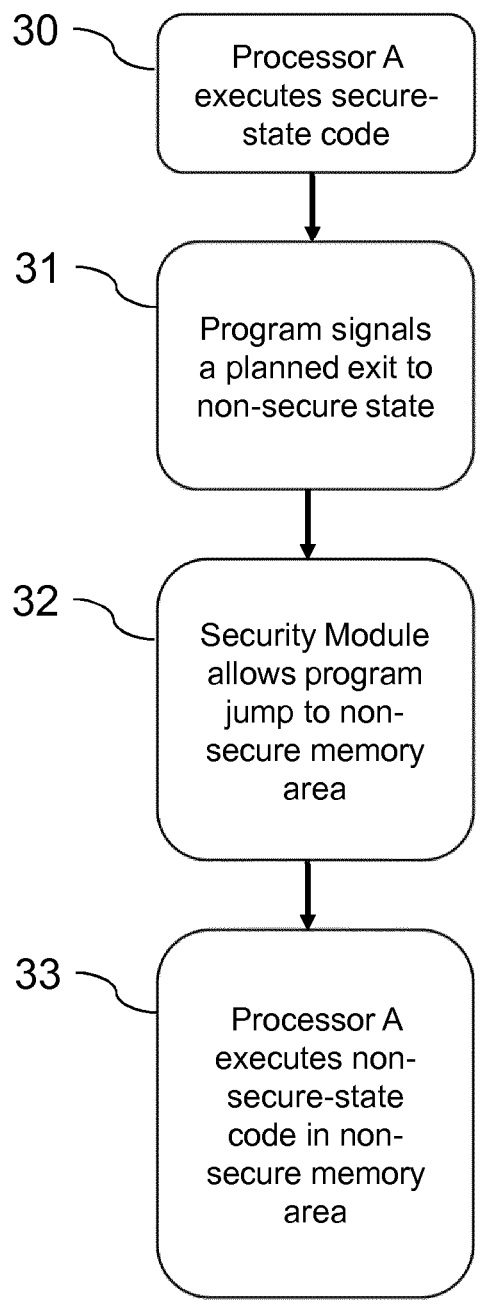
FIG. 3 is a flow chart of steps performed by the device during a successful switch from a secure state to a non-secure state.

FIG. 3 shows some relevant steps performed by the device 1 during a successful switch from a secure state to a non-secure state. This sequence of steps would typically be carried out by the bootloader program code, following on from the steps shown in FIG. 2, although it could also be performed at other times. In a first step 30, the first processor 3 executes secure-state code with the security module 5 in the secure state. In a second step 31, the program code sends a command to the security module 5 to tell the security module 5 to switch to the non-secure state. It may do this by performing a predefined sequence of operations on the first processor 3 and/or over the bus 6, as already described; the security module 5 enters the non-secure state. In a third step 32, the program jumps to a non-secure memory area—e.g., to an address in the second memory 9, or to a non-secure region of the first memory 8; the security module 5 detects the corresponding instruction-fetch request over the bus 6 but does not take any action in response. In a fourth step 33, the first processor 3 executes code from the non-secure memory area; such program cannot access "secure world" resources on the device 1, so is referred to as "non-secure-state code" in FIG. 3.

Figure 4:
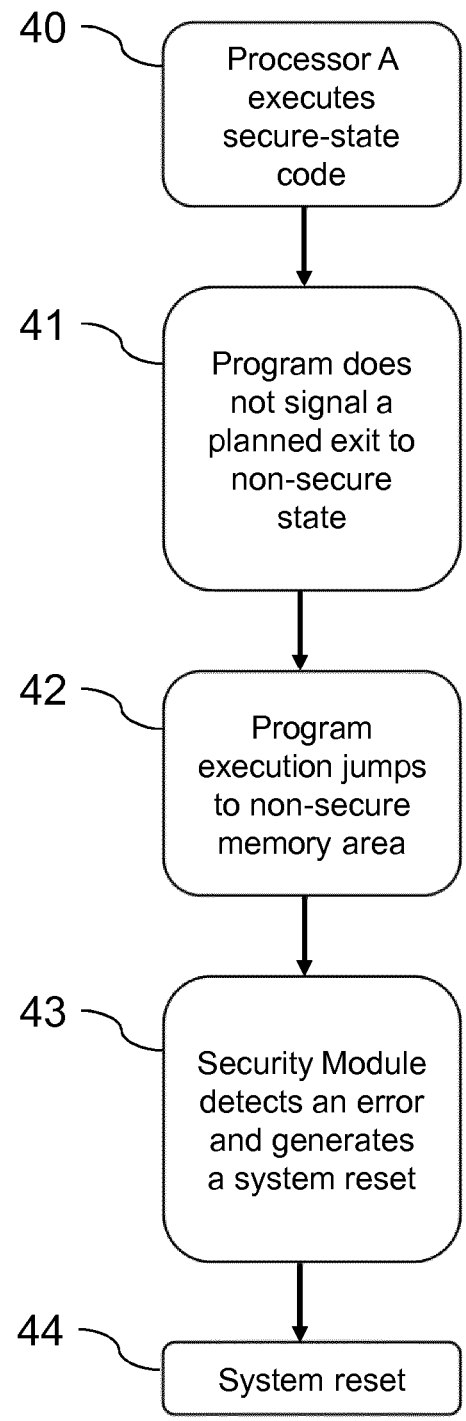
FIG. 4 is a flow chart of steps performed by the device during an attempted branch to non-secure memory while in the secure state.

FIG. 4 shows some relevant steps performed by the device 1 during an attempted branch to non-secure memory while in the secure state. It can be important that the device 1 prevents such a branch from occurring as otherwise it's possible the first processor 3 could have secure-mode access rights while executing code that an attacker has introduced to the non-secure memory. This sequence of steps should never normally be carried out if the device 1 is operating correctly; however, it may be performed if the device 1 contains faulty program code (i.e., containing bugs) or if the device 1 is being attacked. In a first step 40, the first processor 3 executes code with the security module 5 in the secure state. The second step 41 is a null step in which the program code does not send a command to the security module 5 to tell the security module 5 to switch to the non-secure state. In a third step 42, the program attempts to jump to a non-secure memory area—e.g., to an address in the second memory 9, or to a non-secure region of the first memory 8. In a fourth step 43, the security module 5 detects the corresponding instruction-fetch request from the first processor 3, over the bus 6; it determines that the request addresses an area of non-secure memory while the security module 5 is in the secure state; it identifies this as an error and generates a system reset. The security module 5 stores one or more address ranges that define the area or areas of non-secure memory, and determines that the request is for a non-secure area by comparing the address in the bus request with the address range or ranges, to determine if it is falls within one of the non-secure ranges. The security module 5 may also check one or bus access attributes to detect an invalid access—e.g., to distinguish between an instruction fetch and a data read. In a fifth step 44, the device 1 is reset, thereby interrupting the attempted jump and causing the system to re-boot.

FIG. 5 shows some relevant steps performed by the device 1 during a successful switch from the non-secure state to the secure state. This may be done when non-secure-state code (e.g., application code) needs to initiate a sensitive operation, such as the storing of a new secret cryptographic key into a secure region of the first memory 8. In a first step 50, the processor 3 executes the non-secure-state code with the security module 5 in the non-secure state. In a second step 51, the program code initiates the security module 5 snooping; it does this by writing a predetermined value to a non-secure-world-accessible hardware register that enables the snooping. In a third step 52, the program sends a command to the security module 5 to tell the security module 5 to switch to the secure state. It may do this by performing a predefined sequence of operations on the first processor 3 and/or over the bus 6, as already described above. In a fourth step 53, the security module 5 determines that the sequence of operations has been correctly performed, and switches to the secure state. In a fifth step 54, the non-secure-state code branches to secure-state code, located a secure region of the first memory 8, and the first processor 3 executes the secure-state code.

FIG. 6 shows some relevant steps performed by the device 1 during an unsuccessful attempt to switch from the non-secure state to the secure state. This sequence of steps should never normally be carried out if the device 1 is operating correctly; however, it may be performed if the device 1 contains faulty program code (i.e., containing bugs) or if the device 1 is being attacked. In a first step 60, the processor 3 executes non-secure-state code with the security module 5 in the non-secure state. In a second step 61, the program code initiates the security module 5 snooping. In a third step 62, the program attempts to send a command to the security module 5 to tell the security module 5 to switch to the secure state. However, because this non-secure-state program code does not know the correct predefined sequence of operations to be performed on the first processor 3 and/or over the bus 6, it performs an incorrect entry sequence. In a fourth step 63, the security module 5 determines that the sequence of operations has not been correctly performed, and generates a system reset of the device 1. In a fifth step 64, the device 1 is reset, thereby thwarting the attempt to switch to the secure state.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An electronic device comprising:
a processor;
a memory;
a memory controller for controlling access to the memory;
a hardware security module, separate from the processor; and
a bus system, wherein the processor is connected to the bus system at a first connection to the bus system, the hardware security module is connected to the bus system at a second connection to the bus system, and the memory controller is connected to the bus system at a third connection to the bus system,
wherein:
the processor is configured to send requests over the bus system from the first connection to the bus system;
the hardware security module is configured to use the second connection to the bus system to detect requests on the bus system that are sent by the processor from the first connection;
the bus system comprises a dedicated secure-state signal line that is only used to indicate a security state;
the hardware security module has a secure state and a non-secure state;
the hardware security module is configured, when in the secure state, to add a secure-state signal, on the dedicated secure-state signal line, to a first memory-access request that is sent by the processor over the bus system from the first connection and that is detected by the hardware security module at the second connection;
the hardware security module is configured, when in the non-secure state, not to add a secure-state signal, on the dedicated secure-state signal line, to a second memory-access request that is sent by the processor over the bus system from the first connection and that is detected by the hardware security module at the second connection;
the memory controller is configured to receive the first and second memory-access requests over the bus system at the third connection to the bus system, and to determine whether each of the first and second received memory-access requests includes the secure-state signal on the dedicated secure-state signal line;
the memory controller is configured to grant access to a secure region of the memory in response to receiving the first memory-access request that includes the secure-state signal on the dedicated secure-state signal line; and
the memory controller is configured to deny access to the secure region of the memory in response to receiving the second memory-access request that does not include the secure-state signal on the dedicated secure-state signal line.

2. The electronic device of claim 1, wherein the processor does not inherently support a secure state and a non-secure state.

3. The electronic device of claim 1, wherein the memory controller is configured to deny one or more of: write access to the secure region, data read access to the secure region, and execution access to the secure region, when receiving memory-access requests that do not include the secure-state signal on the dedicated secure state signal line.

4. The electronic device of claim 1, wherein the hardware security module is configured to start in the secure state after the device is reset.

5. The electronic device of claim 1, wherein the hardware security module is configured to be switched from the secure state to the non-secure state by software executed by the processor.

6. The electronic device of claim 5, wherein the memory stores software which, when executed by the processor, causes the processor to instruct the hardware security module to switch to the non-secure state.

7. The electronic device of claim 1, further comprising a peripheral that supports memory-mapped input access or output access, wherein the peripheral comprises access logic configured to grant access to a function of the peripheral in response to receiving a request over the bus system that includes the secure-state signal on the dedicated secure-state signal line, and to deny access to the function in response to receiving a request over the bus system that does not include the secure-state signal on the dedicated secure-state signal line.

8. The electronic device of claim 1, wherein the secure region of the memory is defined or is definable by one or more configuration parameters stored in a non-volatile memory of the electronic device, and wherein the hardware security module and memory controller are configured to prevent the processor from writing to said one or more configuration parameters when the hardware security module is in the non-secure state.

9. The electronic device of claim 1, wherein the hardware security module is configured, when in the secure state, to prevent the processor from fetching instructions stored outside the secure region.

10. The electronic device of claim 1, wherein the hardware security module is configured to use the second connection to the bus system to detect requests on the bus system that are sent by a peripheral or by a further processor of the electronic device.

11. The electronic device of claim 1, wherein the hardware security module is configured to switch from the secure state to the non-secure state in response to a switch-to-non-secure command from the processor, or
wherein the hardware security module is configured to switch from the non-secure state to the secure state in response to a switch-to-secure command from the processor.

12. The electronic device of claim 11, wherein the hardware security module is configured to receive said command from the processor at least partly as one or more bus transfers initiated by the processor over the bus system.

13. The electronic device of claim 12, wherein the hardware security module is configured to receive said command from the processor at least partly by detecting a predetermined sequence of one or more bus transfers, initiated by the processor over the bus system, having one or more predetermined address values and/or predetermined data values.

14. The electronic device of claim 11, wherein the hardware security module is configured to receive said command from the processor at least partly over a connection, separate from the bus system, to an internal register of the processor or to a point in the processor that allows the hardware security module to detect a logic level within the processor.

15. The electronic device of claim 14, wherein the hardware security module comprises sensing logic for sensing the contents of said internal register or for sensing the logic level at said point in the processor, and wherein the hardware security module is configured to receive said command from the processor at least partly by sensing a predetermined sequence of one or more values of said internal register or of the logic level at said point, over time, wherein the predetermined sequence of one or more values corresponds to a predetermined sequence of one or more software instructions which, when executed by the processor, cause the contents of the internal register or the logic level at said point in the processor to have said predetermined sequence of one or more values over time.

16. The electronic device of claim 1, wherein the hardware security module is configured to switch from the non-secure state to the secure state at least partly in response to the processor initiating an instruction-fetch bus transfer for fetching an instruction from a predetermined trigger address, wherein the predetermined trigger address is determined in accordance with a value stored in a configuration register of the hardware security module.

17. The electronic device of claim 1, wherein the hardware security module is configured to detect an error in a received command to switch to or from the secure state, and is configured to trigger a reset of the electronic device in response to such detection.

18. The electronic device of claim 1, wherein the hardware security module comprises configuration logic for reading one or more configuration parameters from a non-volatile memory of the electronic device after a reset of the electronic device, and comprises reset logic for holding the processor in reset until after the configuration logic has read the one or more configuration parameters.

19. The electronic device of claim 1, wherein the bus system is an Advanced Microcontroller Bus Architecture (AMBA) bus system.

20. A method of operating an electronic device, the electronic device comprising:
   a processor;
   a memory;
   a memory controller for controlling access to the memory;
   a hardware security module, separate from the processor; and
   a bus system, wherein the processor is connected to the bus system by a first bus connection, the hardware security module is connected to the bus system by a second bus connection, and the memory controller is connected to the bus system by a third bus connection, wherein the bus system comprises a dedicated secure-state signal line that is only used to indicate a security state, and the method comprising:
   the processor sending requests over the bus system from the first connection to the bus system;
   the hardware security module using a connection to the bus system to detect said requests;
   the hardware security module being in a secure state and, when in the secure state, detecting a first memory-access request that is sent by the processor over the bus system from the first connection and that is detected by the hardware security module at the second connection, and adding a secure-state signal, on the dedicated secure-state signal line, to the first memory-access request over the bus system;
   the memory controller receiving the first memory-access request over the bus system at the third connection to the bus system, detecting that the secure-state signal has been added to the first memory-access request on the dedicated secure-state signal line, and, in response to said detecting, granting access to the secure region of the memory;
   the hardware security module being in a non-secure state and, when in the non-secure state, detecting a second memory-access request that is sent by the processor over the bus system from the first connection and that is detected by the hardware security module at the second connection, and not adding the secure-state signal, on the dedicated secure-state signal line, to the second memory-access request over the bus system; and
   the memory controller receiving the second memory-access request over the bus system at the third connection to the bus system, detecting that the secure-state signal has not been added to the second memory-access request on the dedicated secure-state signal line, and, in response to said detecting, denying access to the secure region of the memory.

21. The method of claim 20, wherein the bus system is an Advanced Microcontroller Bus Architecture (AMBA) bus system.

* * * * *